Oct. 22, 1968   K. M. CHRISTENSEN   3,406,949
SANITARY IMMERSION BEARING FOR FOOD PRODUCTS
Filed July 17, 1967   2 Sheets-Sheet 1

INVENTOR.
KENNETH M. CHRISTENSEN
BY
ATTORNEY

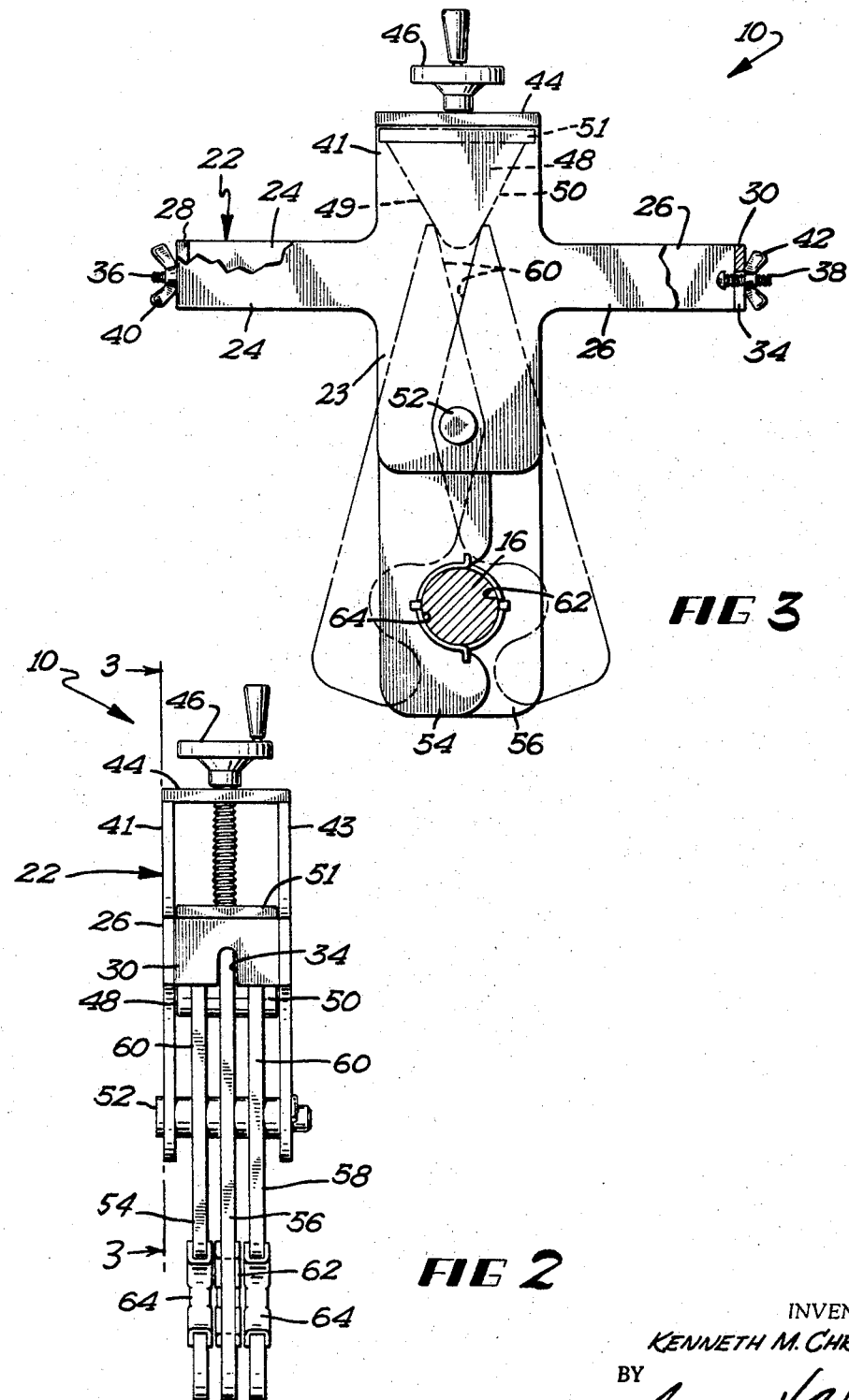

United States Patent Office 3,406,949
Patented Oct. 22, 1968

3,406,949
SANITARY IMMERSION BEARING FOR
FOOD PRODUCTS
Kenneth M. Christensen, Hopkins, Minn., assignor to The
Pillsbury Company, Minneapolis, Minn., a corporation
of Delaware
Filed July 17, 1967, Ser. No. 653,863
8 Claims. (Cl. 259—109)

ABSTRACT OF THE DISCLOSURE

Sanitary bearing for supporting a rotating shaft in food processing equipment. The bearing is composed of two or more pivoted arms consisting of flat plates having jaws at their lower ends. The arms extend downwardly from the pivot and are able to swing about the pivot so that the jaws move together or apart. The plates are not aligned with one another. A cam moves the arms about the pivot for quick removal from the shaft.

---

The present invention relates to food processing equipment and more particularly to an improved bearing for the rotating shaft of an auger, mixer, pump or the like to be operated while immersed in a food product.

The high standards of sanitation that exist in the food industry have produced a long-standing need for improving the cleanliness of food processing machines and in particular the rotating shafts as well as their bearings and associated parts. The bearings that were previously employed were widely acknowledged to fall far short of applicable standards.

The most common previous practice followed in connection with liquid food material is to support rotating shafts, such as horizontally disposed auger shafts, upon external bearings located on the ends of the shaft outside of the vessel within which the auger turns. Seals near each end of the shaft prevent food material that is placed in the vessel from travelling along the shaft beyond the end of the vessel. Seals of this kind are not entirely satisfactory owing to the tendency for the food material to penetrate into it no matter how well designed. There is, moreover, a tendency for the rotating shaft to transfer liquid or semi-liquid materials through the seal due to the rotation of the shaft itself. This can produce a serious bacteriological problem in and around the seals unless they are frequently removed and cleaned. Thus, when this type of seal is employed although the bearing itself does not contact the food material, a potential sanitation problem is present in the shaft seal.

A variety of other bearings have been proposed for use in various industries including the food industry. Ball or roller type bearings are entirely unsuited for immersion operation because of the difficulty of cleaning them effectively and the tendency for material to become lodged in the openings between the balls or rollers. Split bearings of the type containing bushings are troublesome due to the tendency for food material to become lodged in them, particularly between the flat mating surfaces of the bearings. In the event bolts or other fasteners employed for holding the halves of the split bearing together there, the bolt openings serve as an additional location for food material to become lodged. All of the above bearing designs have still another important deficiency and that is the inconvenience and time required for removal and cleaning. Furthermore, when replaced they must be adjusted to provide the appropriate clearance between the shaft and bearing.

In view of these and other deficiencies of the prior art, it is one object of the present invention to provide an improved sanitary bearing suited for liquid food materials which meets the applicable standards of sanitation for immersion within the food material being processed.

Another object of the invention is the provision of an improved immersion bearing for food processing equipment which can be easily and quickly cleaned on all surfaces.

A further object of the invention is the provision of an improved bearing of the type described which can be formed from any of a variety of inert materials that have no tendency to contaminate the food being processed.

A still further object of the invention is the provision of an improved food processing bearing wherein the food material itself acts as a lubricant and the flow of food material through the bearing tends to remove the material which would otherwise become lodged between adjacent parts of the bearing.

Another object of the invention is the provision of an improved bearing of the type described wherein the clearance between the supported shaft and the bearing surfaces is automatically determined when reassembled.

A further object of the invention is the provision of an improved bearing of the type described which can be disassembled and removed without tools.

A further object of the invention is the provision of a bearing of the type described wherein the shaft supported therein is automatically dropped when the bearing is opened and automatically picked up when the bearing is closed.

These and other more detailed and specific objects will become apparent in view of the following specification and drawings, wherein:

FIGURE 2 is a side elevational view of the bearing in accordance with the invention on a larger scale relative to FIGURE 1.

FIGURE 3 is an end elevational view taken on line 3—3 of FIGURE 2.

In brief terms, the present invention provides an improved sanitary immersion bearing for food processing equipment including a container in which a liquid food product is placed and a rotating shaft located at least in part within the food in the container. The bearing consists of a bracket and at least two arms formed from plates, each with a jaw defined by centrally directed circular recess at its lower end. The arms are movably mounted on the bracket such that the jaws are able to move toward and away from one another for engaging the shaft when in use for disengaging the shaft when the bearing is to be removed. The jaws are spaced from one another along the axis of the shaft so that each jaw engages only one-half of the shaft and the other half is left open so as to prevent the food material from becoming trapped between the jaws. The jaws are preferably mounted upon the bracket for pivotal movement about an axis positioned parallel to the shaft and located a few inches above it.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will now be described, particularly in connection with the support of an auger shaft, but it is apparent that it can be employed in a variety of different food processing equipment such as mixers or pumps having either vertical or horizontal shafts.

Figure 1:
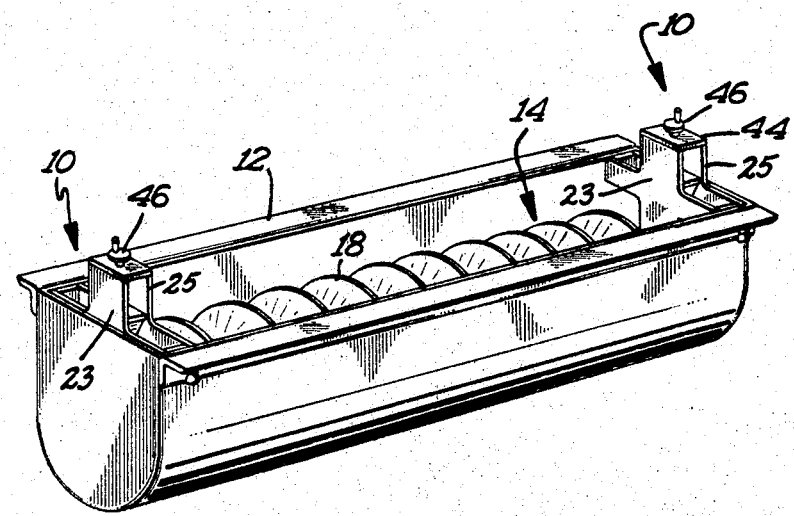
FIGURE 1 is a perspective view of the invention as it appears when it is used for supporting a horizontal auger shaft.
Figure 4:
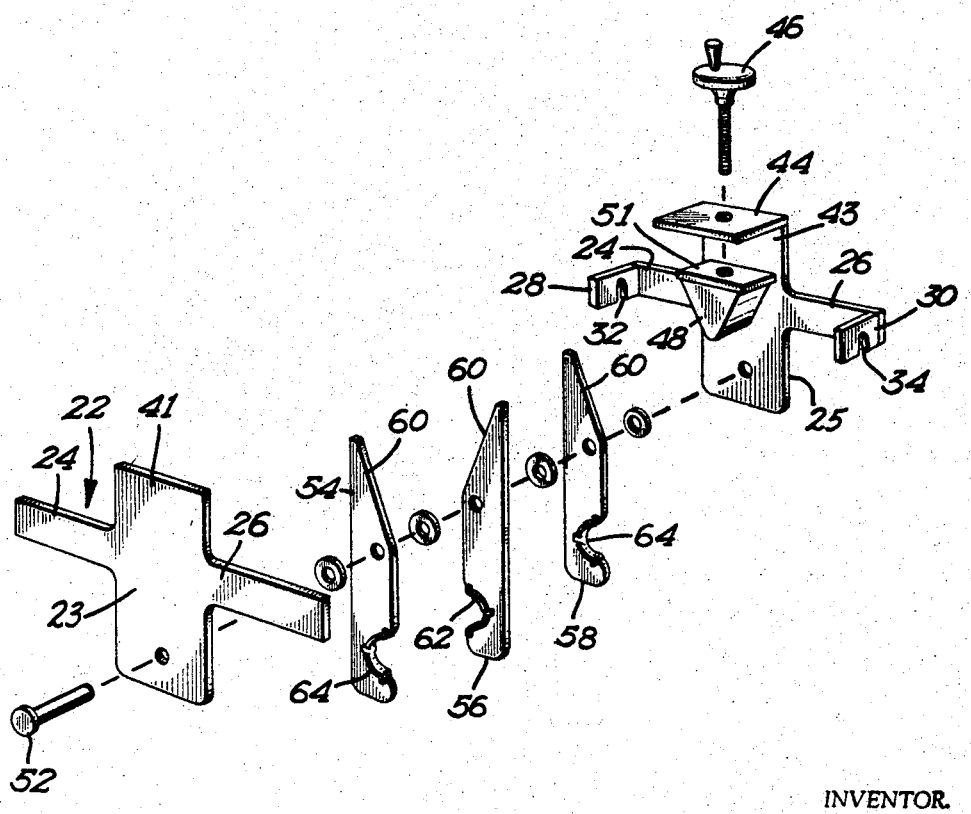
FIGURE 4 is an exploded perspective view of a bearing in accordance with the invention.

Referring now to the drawings, there is shown a bearing 10 in accordance with the present invention. One of the bearings 10 as seen in FIGURE 1 is positioned at opposite ends of a container 12 for liquid food materials. The container 12 in this instance consists of a trough. Within the trough is mounted an auger 14 consisting of a horizontally disposed shaft 16 and an auger flight 18. Rotation is imparted to the auger 14 by means of a suitable drive motor (not shown). It will be understood that rotation of the auger will agitate the food material within the container 12 as it is transported toward one end of the container.

The bearing 10 consists of a bracket 22 composed of parallel vertically disposed, rigidly connected plates 23 and 25, each including two support arms 24 and 26 that extend laterally to the sides of the container 12. Cross pieces 28 and 30 are provided with downwardly opening slots 32 and 34 respectively that fit over centrally extending bolts 36 and 38 which can be tightened by means of wing nuts 40 and 42 respectively for releasably securing the bracket 22 in position.

The bracket 22 also includes two centrally located vertically extending tongues 41 and 43 which are connected at their upper ends by means of a cross plate 44 within which the shaft of a hand wheel 46 is mounted for rotation. The lower end of the shaft is threaded into a V-shaped cam 48 having obliquely related cam surfaces 49 and 50 which are positioned to engage portions of the bearing support arms to be described below. At the top of the cam member 48 is provided a stop 51 for purposes hereinafter described.

As best seen in FIGURES 2 and 3, a pivot 52 is provided in the bracket 22. The pivot 52 is positioned several inches above and parallel to the shaft 16 of the auger 14. Mounted for free swinging movement on the pivot 52 are three arms designated 54, 56 and 58. It should be noted that the arms 54, 56 and 58 as best seen in FIGURE 3 are displaced with one another along the axis of the shaft 16, i.e. they are out of lateral alignment.

Each of the arms includes a ramp surface 60 positioned to engage one of the surfaces 49 and 50 of the cam 48. Each arm also includes a semi-circular recess 62 that defines the jaw adapted to engage the sides of the shaft 16 as best seen in FIGURE 2. Since the area adjacent the shaft 16 opposite each jaw is left open, the food material will be able to circulate freely through the bearing throughout operation. The food, therefore, acts to some degree as a lubricant and the flow of food material through the bearing serves, in part, to carry away food material which might otherwise remain trapped in the bearing. The bearing can, therefore, be thought of as self-cleaning. Immediately below the recess 62 is an inclined shaft elevating surface 64 which functions when the jaws move toward one another to lift the shaft 16 from its unsupported position within the container 12 to an operative position within the recesses 62.

The operation of the bearing will now be described. It will be assumed that the bearings are in the normal position assumed during use. When it is desired to disassemble the bearing, the hand wheel is turned in the appropriate direction to elevate the cam 48. This allows the weight of the shaft 16 to force the jaws away from one another to the dotted line position of FIGURE 3 allowing the auger to fall to the bottom of the container 12. Once the jaws have been separated in this manner, the bearing can be easily cleaned by flushing it with water either inside the container 12 or, if desired, the wing nuts 40 and 42 can be loosened and the entire bracket 22 as well as the jaws can be removed from the container 12.

The bearings are then placed back on the bolts 36 and 38 and the wing nuts 40 and 42 are tightened until the bracket 22 is securely locked in position. The lower ends of the arms 54, 56 and 58 will then be spread apart and located on opposite sides of the shaft 16. The hand wheel 46 is then turned in the appropriate direction to force the cam 48 downwardly against the arms. Engagement between the cam and the ramp 60 forces the jaws towards one another and the inclined surfaces 64 at the lower edges of the recesses 62 engage the surface of the shaft 16 and cause it to rise from the lowered position to the operating position. Rotation of the hand wheel is continued until the stop 51 strikes the upper ends of the arms 54, 56 and 58. The stop 51 is located in a predetermined position relative to the upper ends of the arms so that the proper clearance is established between the shaft 16 and the jaws.

Bearings produced in accordance with the present invention have been used under service conditions and were found to meet the requirements of the applicable government standards of cleanliness for operation within food materials. The bearings could be easily removed, quickly cleaned and the free flow of fluid food material through the bearing assists in preventing the entrapment of food particles. There is consequently little tendency for bacteriological contamination to occur.

It is apparent that many modifications and variations of this invention as hereinbefore set forth be made without departing from the spirit and scope thereof. The specific embodiments described are given by way of example only and the invention is limited only by the terms of the appended claims.

I claim:

1. A sanitary bearing for food processing equipment including a container having a rotating shaft mounted for rotation therein and being adapted to contain the liquid food material, said bearing comprising a bracket, at least two arm members having centrally directed recesses defining jaws at their free ends, means on the bracket for movably supporting the arms whereby the jaws can be moved toward or away from one another, said jaws being spaced from one another axially of the shaft to maintain the area on the opposite side of the shaft from the recess unobstructed thereby permitting said liquid food material to flow through and around said bearing, and a manually operable means mounted upon the bracket and operatively associated with the arms for changing the spacing between the jaws whereby the shaft can be released by separating the jaws from one another when the bearing is to be cleaned.

2. The apparatus according to claim 1 wherein the movable means for changing the spacing between the arms comprises a cam member adapted to engage portions of the arms for swinging the arms about a pivotal connection between the bracket and each arm.

3. The apparatus according to claim 2 wherein an upwardly inclined ramp surface is provided upon each arm below the recesses for raising the shaft to the operating position when the jaws are moved toward one another.

4. The apparatus according to claim 1 wherein the arms are pivotally mounted upon the bracket for swinging movement about an axis extending parallel to the shaft and located above the shaft.

5. The apparatus according to claim 1 wherein the bracket is composed of a pair of parallel vertically disposed plates, the arms are mounted between the plates for swinging movement on a horizontally dsiposed pivot axis and located above the shaft being parallel thereto and the means for changing the spacing between the jaw comprises a cam member and a hand wheel operatively associated therewith for moving the cam member upwardly and downwardly on the bracket and each of the jaws includes a ramp surface adapted to engage the cam whereby the downward movement of the cam member will force the lower ends of the arms towards one another.

6. The apparatus according to claim 1 wherein three axially spaced arm members are provided including a pair of arm members on the same side of the shaft and a third member located on the opposite side of the shaft between the other two arm members.

7. The apparatus according to claim 1 wherein a stop means is provided upon the apparatus, said stop means being operatively associated with the arms for limiting the pivotal movement of the jaws toward one another whereby the clearance between the jaws and the shaft will be determined by the stop means.

8. The apparatus according to claim 1 wherein the bracket includes laterally extending support arms and a fastening means at the ends of the support arms for releasably securing the bracket to the container.

References Cited

UNITED STATES PATENTS

| | | | |
|---|---|---|---|
| 2,142,879 | 1/1939 | Alexandro | 259—109 |
| 2,576,575 | 11/1951 | Collins | 259—109 |
| 3,145,017 | 8/1964 | Thomas | 259—45 |
| 3,251,579 | 5/1966 | Lasar | 259—46 |

ROBERT W. JENKINS, *Primary Examiner.*